United States Patent [19]
Baek

[11] Patent Number: 6,081,726
[45] Date of Patent: Jun. 27, 2000

[54] DIGITAL CORDLESS TELEPHONE SYSTEM WITH IMPROVED INCOMING CALL AND HANDOVER SERVICES

[75] Inventor: Chang-In Baek, Seoul, Rep. of Korea

[73] Assignee: Samsung Electronics Co., Ltd., Rep. of Korea

[21] Appl. No.: 08/903,126

[22] Filed: Jul. 30, 1997

[30] Foreign Application Priority Data

Aug. 5, 1996 [KR] Rep. of Korea ............ 8-32664

[51] Int. Cl.⁷ .................................. H04M 11/00
[52] U.S. Cl. .............................. 455/465; 455/436
[58] Field of Search ...................... 455/432, 436, 455/439, 438, 465, 440, 444

[56] References Cited

U.S. PATENT DOCUMENTS

| | | | |
|---|---|---|---|
| 4,975,910 | 12/1990 | Onder ................................ | 370/469 |
| 5,243,641 | 9/1993 | Evans et al. ...................... | 455/439 |
| 5,282,239 | 1/1994 | Yokoi et al. ...................... | 455/465 |
| 5,384,824 | 1/1995 | Alvesalo .......................... | 455/465 |
| 5,442,684 | 8/1995 | Hashimoto et al. ................ | 455/463 |
| 5,465,397 | 11/1995 | Pickert ............................ | 455/465 |
| 5,513,248 | 4/1996 | Evans et al. ...................... | 455/465 |
| 5,583,913 | 12/1996 | Taketsugu ........................ | 455/466 |
| 5,608,780 | 3/1997 | Gerszberg et al. ................ | 455/436 |
| 5,657,375 | 8/1997 | Connolly et al. ................. | 455/436 |
| 5,771,275 | 6/1998 | Brunner et al. .................. | 455/436 |
| 5,802,465 | 9/1998 | Hamalainen et al. .............. | 455/403 |
| 5,822,313 | 10/1998 | Malek et al. ..................... | 455/442 |
| 5,845,211 | 12/1998 | Roach, Jr. ....................... | 455/436 |
| 5,884,173 | 3/1999 | Sollner .......................... | 455/436 |

FOREIGN PATENT DOCUMENTS

WO 95/10923 4/1995 WIPO ............................ 455/463

OTHER PUBLICATIONS

Newton's Telecom Dictionary. 10th Edition. pp. 366,1124–1125,197, 1996.

Goodman, Network Control in Fuiture Wireless Information Networks. IEEE International Conference on Selected Topics in Wireless Communications. pp. 1–5, Feb. 1992.

Li et al. CDCT Performance Analysis. International Conference on Communication Technology Proceedings. vol. 2. pp. 879–883, May 1996.

Woo et al. handoff Enhancemnt in Mobile–IP Environment. IEEE International Conference on Univerisal Personal Communications. vol. 2, pp. 760–764, Apr. 1996.

Carpintero et al. networking Requirements in a Wireless System. IEEE International Conference on Selected Topics in Wireless Communications. pp. 396–401, Feb. 1992.

*Primary Examiner*—Emanuel Todd Voeltz
*Assistant Examiner*—M. David Sofocleous
*Attorney, Agent, or Firm*—Dilworth & Barrese

[57] ABSTRACT

In a preferred embodiment, a digital cordless telephone system includes a public switched telephone network (PSTN) connected to general telephones, a public switched data network for receiving and transmitting designated packet data, a plurality of digital cordless telephones, and a plurality of public base stations. Each base station is assigned to a designated service area and controls the digital cordless telephones located in its service area. A plurality of local control units are connected to respective public base stations through the PSTN, each local control unit storing information concerning the public base stations in its service area. A central control unit stores information concerning the respective cordless telephones, and is responsive to a request for an incoming call service by the PSTN to determine the cordless telephone according to the request, to control one of the local control units through the public switched data network, and to provide the cordless telephone with the incoming call service. The system also includes handoff capabilities.

12 Claims, 1 Drawing Sheet

DIGITAL CORDLESS TELEPHONE SYSTEM WITH IMPROVED INCOMING CALL AND HANDOVER SERVICES

BACKGROUND OF THE INVENTION

1. Field of the Invention

The present invention relates to a digital cordless telephone system and, more particularly, to a digital cordless telephone system that provides improved incoming/outgoing and handover services.

2. Description of the Related Art

With the development of mobile communications, the demand for personal mobile communication devices has been increasing in recent years. In particular, cordless telephones used in cordless telephone networks have been in widespread use. Generally, cordless telephone networks are designed for mobile radio coverage over relatively small distances. The earliest cordless telephone was a CT0 (Cordless Telephone) of 46/49 MHz which operated in an analog mode. This was followed by a CT1 (1st generation Cordless Telephone) of 900 MHz. A digital cordless telephone system known as a CT2 or CT-2 (2nd generation Cordless Telephone) was subsequently developed. CT-2 systems are manufactured by Dassault Corporaton in France and by GPT Corporation in Great Britain.

The CT-2 system by Dassault is restricted in its services for users because it can provide only incoming call service based on a manual location-registration, and is incapable of providing handover services. Compared with the Dassault CT-2, CT-2 systems produced by GPT may provide better incoming/outgoing and handover services. However, the GPT system presents users with limited services due to its peculiar construction which employs a paging network.

SUMMARY OF THE INVENTION

An object of the present invention is to provide a digital cordless telephone system having improved incoming call and handover services.

Another object of the present invention is to provide a digital cordless telephone system with incoming call and handover services using a public switched telephone network and a public switched data network.

In an exemplary embodiment of the present invention, a digital cordless telephone system includes a plurality of general telephones and digital cordless telephones, a public switched telephone network (PSTN) connected to the respective general telephones, a public switched data network for receiving and transmitting designated packet data, and a plurality of public base stations, each assigned to a designated service area and controlling the digital cordless telephones located in its service area. A plurality of local control units are connected to respective public base stations through the PSTN. Each local control unit stores information concerning the public base stations in its service area. A central control unit stores information concerning the respective cordless telephones, and is responsive to a request for an incoming call service by the PSTN to determine the cordless telephone according to the request, to control one of the local control units through the public switched data network, and to provide the cordless telephone with the incoming call service. The local control units coordinate handoffs when a cordless telephone moves from one service area to another.

DETAILED DESCRIPTION OF THE PREFERRED EMBODIMENT

Figure 1:
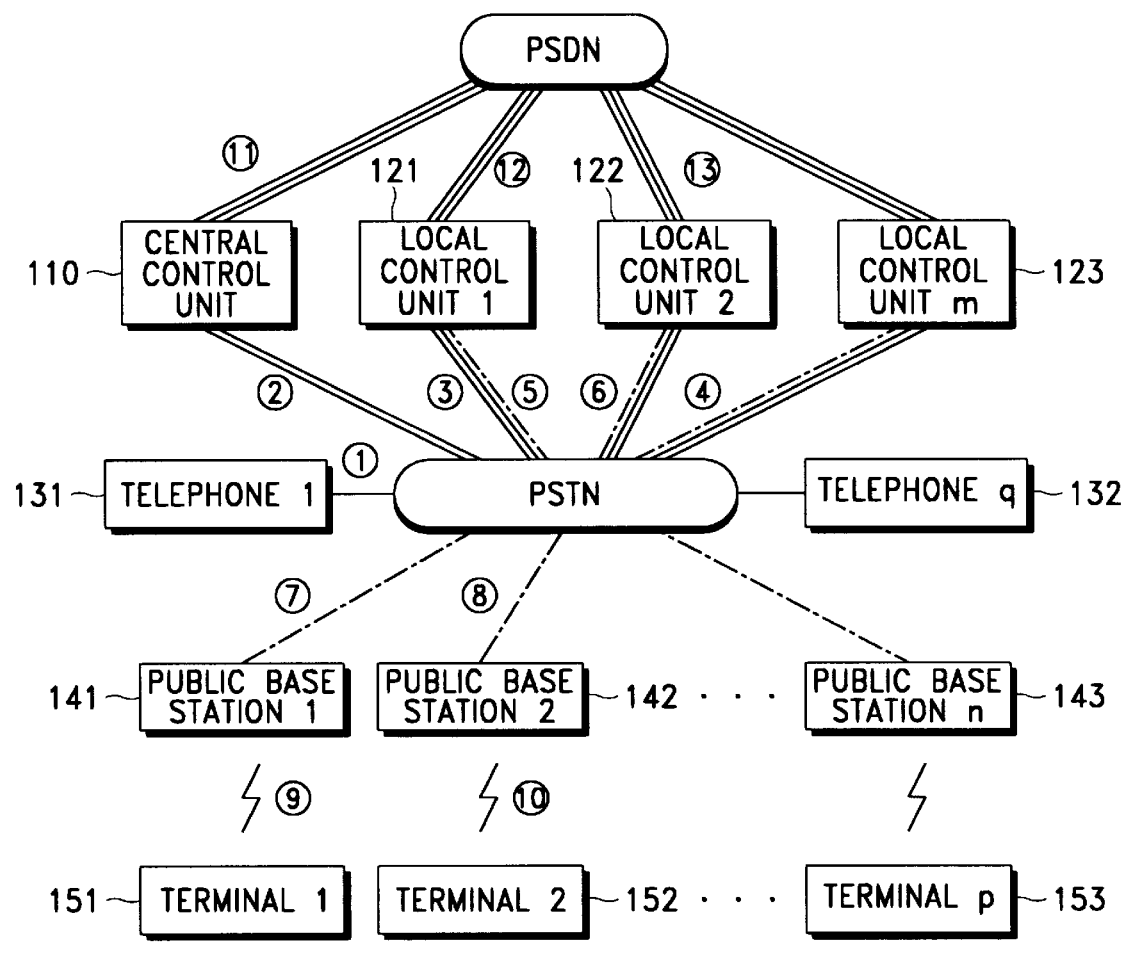
FIG. 1 shows the construction of a digital cordless telephone system according to the preferred embodiment of the present invention.

FIG. 1 shows the construction of a CT-2 system according to the present invention. A Public Switched Data Network (PSDN) receives and transmits data by using an X.25 protocol. A Public Switched Telephone Network (PSTN) receives and transmits voice data through a modem which is connected thereto. The PSDN is connected to a central control unit 110 and local control units such as 121, 122 and 123 through PSDN dedicated lines such as 11–13. Central control unit 110 is also connected to the PSTN via PSTN trunk lines, and the local control units 121, 122 and 123 are connected to the PSTN via PSTN trunk lines and PSTN dedicated lines. The PSTN is further connected to general telephones (e.g., wireline telephones) as 131 and 132 through PSTN general lines and to public base stations as 141, 142 and 143 through the PSTN dedicated lines. Public base stations 141, 142 and 143 are cordlessly connected to individual CT-2 terminals (hereinafter, referred to as "terminals") such as 151–153.

Central control unit 110, which is in charge of the maintenance and control of entire CT-2 system processes, stores and controls various information (e.g., location data) concerning the CT-2 terminals' subscribers in real time. It is matched with up to m local control units as 123, to receive and transmit in real time various information associated with the subscribers such as location data, registration data, black list data and the like.

By having a trunk matching E1/T1 with the PSTN to form communication lines between the telephones and the terminals, the central control unit 110 can identify the local control unit in which the terminal to be called by a certain telephone is registered. As such, central control unit 110 switches communication lines to the related local control unit via the trunk line and transmits the terminal's ID number in the form of a telephone number to the local control unit.

The respective local control units as 121, 122 and 123 are always connected to respective public base stations 141, 142 and 143 through the PSTN dedicated lines, e.g., lines 4–8. The PSTN dedicated lines may be, for example, six lines at maximum; one being a line for a modem to receive and transmit various data between the public base stations and local control units, the other five lines being voice communication lines for supporting communication with, e.g., a maximum of five subscribers per one local base station,.

The local control units as 121, 122 and 123 transmit and receive various information concerning the subscribers with the central control unit 110 via the PSDN. Each local control unit always keeps track of the locations of the terminals registered therein and determines the base station having a local service area where a certain terminal is currently located. In response to an incoming call for the terminal in the service area, the respective local control unit switches the communication line between the terminal and base station so as to provide an incoming call service. The local control unit may have a VMS (Voice Mailing System) installed therein, thereby providing different voice information in accordance with a call to the subscribers of the terminal and telephone, and storing the voice information, if necessary.

Another important role of the local control unit 121, 122 and 123 is to exchange the terminal subscribers' location information with up to "n" public base stations as 141, 142 and 143 in real time by using PSTN lines dedicated for data transmission. When the terminal is in the service area of another base station, the local control unit commands the related base station to furnish a handover service and switches the PSTN dedicated lines for voice communication. In addition, the local control unit generates charging data according to incoming and outgoing calls and transfers it to central control unit 110.

The public base stations as 141, 142 and 143 always check on whether each terminal on line or ready to be on line is in the service area, thus reporting any changes in the terminal's location to the local control units via the PSTN lines dedicated for modem data. The terminals 151, 152 and 153 are cordless telephones that communicate with another terminal or telephone subscribers through incoming and outgoing calls with the public base stations.

The CT-2 system as illustrated in FIG. 1 can furnish incoming/outgoing and handover services. The incoming call service of the present invention is based on automatic location-registration, unlike the incoming call service provided by the CT-2 system of Dassault mentioned above. It also avoids using a paging network, thus providing smooth services to users, contrary to the CT-2 system of GPT.

With continuing reference to FIG. 1, operation of the the incoming call service provided by the CT-2 of the preferred embodiment will now be described. It is assumed that the subscriber of a first telephone 131 desires a call connection to a first terminal 151. On dialing an incoming number (e.g., 018-123-4567) of the first terminal 151, the PSTN exchange recognizes the incoming number received through a PSTN general line 1 and switches to the central control unit 110 through a PSTN trunk line 2.

Recognizing the incoming number through the line 1, the central control unit 110 determines which local control unit has the location-registration of the first terminal 151. If the first terminal is not registered, the system informs the first telephone 131 that an incoming call service is not available and interrupts the service. If the first terminal 151 is location-registered in a first local control unit 121, the central control unit 110 informs the first local control unit 121 that there is an incoming call for the first terminal 151, through PSTN trunk lines 2 and 3.

When the first local control unit 121 recognizes the request for the incoming call, it searches for information concerning the location-registration and determines which base station covers the service area in which the first terminal 151 is location-registered. If the called terminal 151 is not registered, the first local control unit informs telephone 131 that an incoming call service is not available, and interrupts the incoming call service. If terminal 151 is location-registered in public base station 141, local control unit 121 informs terminal 151 that there is an incoming call, through PSTN dedicated lines 5 and 7. (PSTN lines 5 and 7 may be used for transmitting data as well as for voice communications). Local control unit 121 transmits a ring-back tone to the first telephone 131 and an alert tone to the first public base station 141. If no off-hook signal is detected from the first public base station 141 for a designated time, the first local control unit 121 informs the first telephone 131 that the incoming call service is not available, and interrupts the service. The first public base station 141 converts the incoming number (018-123-4567) received through the line 7 as a private identifier PID and informs first terminal 151 that there is an incoming call.

When the incoming call for the first terminal 151 is recognized through a radio link 9, the first terminal 151 generates an alert tone. When the first terminal 151 goes off-hook in response, communication with the user of first telephone 131 is established.

The operation of an outgoing call service provided by the CT-2 of the preferred embodiment will now be described. It is assumed that the subscriber of the first terminal 151 desires to call a user of first telephone 131. Once the subscriber of first terminal 151 is cordlessly linked with the first public base station 141 and dials the first telephone's number (e.g., 567-1234), the number dialed is transferred to the first local control unit 121 via lines 7 and 5. Recognizing the request for an outgoing call from terminal 151, the local control unit 121 forwards a request through a trunk line 3 to the PSTN, requesting that an outgoing call be switched. The PSTN exchange which received the telephone number "567-1234" from the line 3, switches the communication line to the first telephone 131 through the PSTN general line 1, transmitting a ring-back tone to terminal 151 and an alert tone to telephone 131. When the user of telephone 131 goes off-hook, communication with the user of terminal 151 is established.

Operation of handover service provided by the CT-2 system of the preferred embodiment is now described. By way of example, when communication is established between first terminal 151 and first telephone 131 through public base station 141, as discussed above, public base station 141 transmits information associated with first terminal 151 such as PID, LID, TRD, RF channel and the like to the local control unit 121, via PSTN dedicated lines 7 and 5. Now, it is assumed that the subscriber of first terminal 151 is on line with a user of first telephone 131 in the service area of public base station 141, and is moving into the service area of public base station 142. When the subscriber of terminal 151 on line is out of the service area of base station 141 and moves into the service area of the base station 142, the communication between terminal 151 and base station 141 is immediately interrupted. Base station 141 informs the local control unit 121 that the communication with terminal 151 has failed, prior to performing a reset. Local control unit 121 transmits information concerning terminal 151 to the second public base station 142 in the local area with the first public base station 141 and tries to reset for the first terminal 151. With the reset in the first public base station 141, the PSTN dedicated lines for voice communications are maintained. When the second public base station 142 performs a reset and reports it to the first local control unit 121, the PSTN dedicated line for voice communications are switched to the second public base station 142, converting the sequence of switching the communication lines from (3)→(5)→(7) to (3)→(5)→(8). The subscriber of the first terminal 151 on line with that of the first telephone 131 through the first public base station 141 can keep the communication through the second public base station 142 without any interruption. As a result, a handover service is furnished to have no interruption of communication by forming a cordless link with a proper base station in accordance with changes in the terminal's location.

It will be understood that the present invention is not limited to the particular embodiment disclosed herein as the best mode contemplated for carrying out the present invention. Various modifications can be made to the disclosed embodiments without departing from the scope of the invention as defined by the appended claims.

What is claimed is:

1. A digital cordless telephone system comprising:
   a plurality of general telephones;
   a public switched telephone network (PSTN) connected to the respective general telephones;
   a public switched data network (PSDN) for receiving and transmitting designated packet data;

a plurality of digital cordless telephones;

a plurality of public base stations, each being assigned to a designated service area and controlling the digital cordless telephones located in its service area;

a plurality of local control units connected to the respective public base stations through the PSTN, each local control unit storing information concerning the public base stations in its service area and bridging the PSTN to the PSDN; and a central control unit bridging the PSDN to the PSTN and storing information concerning the respective cordless telephones, the central control unit being responsive to a request for an incoming call service by the PSTN to determine the cordless telephone according to the request, to control one of the local control units storing information concerning one of the plurality of public base stations assigned to a designated service area in which the cordless telephone is located, and to transmit at least a first signal via the PSTN to said one of the local control units which in turn transmits at least a second signal to the cordless telephone via the PSTN to provide the cordless telephone with the incoming call service.

2. The telephone system of claim 1 wherein a first of said local base stations is operative to monitor locations in a first associated service area of a given digital cordless telephone in a current communication session, and to transmit information to a first local control unit concerning movement of the given cordless telephone towards a location outside the first service area; and the first local control unit being responsive to the movement information to coordinate a handoff of the communication session to a second base station covering a second service area in which the given cordless telephone is moving into.

3. The telephone system of claim 2 wherein:

when the given cordless telephone is in the first service area, the path of the communication session includes a path from the PSTN to the first local control unit, from the first local control unit to the PSTN, and from the PSTN to the first base station, and;

when the given cordless telephone is in the second service area, the path of the communication session includes a path from the PSTN to the first local control unit, from the first local control unit to the PSTN, and from the PSTN to the second base station.

4. The telephone system of claim 3 wherein said path from the PSTN to the first local control unit is via a PSTN trunk line, said path from the first local control unit to the PSTN is via a PSTN dedicated line, and said paths from the PSTN to the first and second base stations, respectively, are via respective PSTN dedicated lines.

5. The telephone system of claim 1 wherein the PSTN is connected to each public base station via a PSTN dedicated line, the PSTN is connected to each local control unit via a PSTN trunk line and a PSTN dedicated line, the PSTN is connected to the central control unit via a PSTN trunk line, and the PSDN is connected to each local control unit and to the central control unit via a respective PSDN dedicated line.

6. A digital cordless telephone system for providing communication links between telephones and digital cordless terminals, said system comprising:

a public switched data network (PSDN);

a public switched telephone network (PSTN) configured to switch calls to and from said telephones;

a plurality of public base stations, each being assigned to a designated service area and cordlessly linked to digital cordless terminals located in its service area;

a plurality of local control units connected to public base stations through the PSTN, each local control unit bridging the PSTN to the PSDN and associated with a service region that includes a plurality of said service areas, wherein digital cordless telephones currently located within a region of a particular local control unit are caused to be registered with that local control unit; and a central control unit storing information concerning the respective cordless terminals, the central control unit being responsive to a request for an incoming call service by the PSTN to determine a particular cordless terminal according to the request by determining which of said plurality of local control units has the particular cordless terminal registered, and to control the local control unit in which the particular cordless terminal is currently registered, the local control unit determining which of said plurality of base stations covers the service area in which the particular cordless terminal is registered to provide the particular cordless terminal with the incoming call service.

7. The telephone system of claim 6 wherein during a communication session involving any given digital cordless terminal within a first service area covered by a first one of said local base stations, the first local base station is operative to determine whether the given cordless terminal is moving out of the first service area and to transmit information to a first local control unit indicative of such movement, said first local control unit being responsive to such movement information to coordinate a handoff of the communication session to a second base station covering a second service area in which the given cordless terminal is moving into, said handoff being implemented by the PSTN switching the communication session from the first base station to the second base station.

8. The telephone system of claim 7 wherein:

when the given cordless terminal is in the first service area, the path of the communication session includes a path from the PSTN to the first local control unit, from the first local control unit to the PSTN, and from the PSTN to the first base station, and;

when the given cordless telephone is in the second service area, the path of the communication session includes a path from the PSTN to the first local control unit, from the first local control unit to the PSTN, and from the PSTN to the second base station.

9. The telephone system of claim 8 wherein said path from the PSTN to the first local control unit is via a PSTN trunk line, said path from the first local control unit to the PSTN is via a PSTN dedicated line, and said paths from the PSTN to the first and second base stations, respectively, are via respective PSTN dedicated lines.

10. The telephone system of claim 6, said central control unit bridges the PSTN to the PSDN and in response to said request for incoming call service, said central control unit controls said particular cordless terminal through the public switched data network.

11. The telephone system of claim 6 wherein the PSTN is connected to each public base station via a PSTN dedicated line, the PSTN is connected to each local control unit via a PSTN trunk line and a PSTN dedicated line, the PSTN is connected to the central control unit via a PSTN trunk line, and the PSDN is connected to each local control unit and to the central control unit via a respective PSDN dedicated line.

12. A digital cordless telephone system comprising:

a public switched data network (PSDN);

a public switched telephone network (PSTN);

a plurality of digital cordless telephones;

a plurality of public base stations, each being assigned to a designated service area, monitoring the location of the digital cordless telephone in its service area and, with the change in the digital cordless telephone's location, transmitting information concerning the digital cordless telephone moved; and a plurality of local control units connected to the respective public base stations through the PSTN, each local control unit storing information concerning the public base station in its service area and bridging the PSTN to the PSDN and, when provided with information concerning the change in the digital cordless telephone's location, requesting for a reset to the nearest public base station by transmitting at least one signal via the PSTN to the digital cordless telephone on line so as to provide telephone service through the public base stations.

* * * * *

UNITED STATES PATENT AND TRADEMARK OFFICE
CERTIFICATE OF CORRECTION

PATENT NO. : 6,081,726

DATED : June 27, 2000

INVENTOR(S) : Chang-In Baek

It is certified that error appears in the above-identified patent and that said Letters Patent is hereby corrected as shown below:

On the title page item [30], Foreign Application Priority Data:

"Aug. 5, 1996 [KR]   Rep. of Korea.......................... 8-32664" should be:

--Aug. 5, 1996 [KR]   Rep. of Korea.......................... 96-32664--.

Signed and Sealed this

Seventeenth Day of April, 2001

*Attest:*

NICHOLAS P. GODICI

*Attesting Officer*   *Acting Director of the United States Patent and Trademark Office*